United States Patent [19]

Dahms

[11] 4,112,188

[45] Sep. 5, 1978

[54] RESOLE RESIN BINDER COMPOSITION

[75] Inventor: Ronald H. Dahms, Springfield, Mass.

[73] Assignee: Monsanto Company, St. Louis, Mo.

[21] Appl. No.: 768,304

[22] Filed: Feb. 14, 1977

Related U.S. Application Data

[62] Division of Ser. No. 634,572, Nov. 24, 1975, Pat. No. 4,045,398.

[51] Int. Cl.$^2$ .................... B32B 17/04; B32B 27/42
[52] U.S. Cl. ................................ 428/436; 210/508; 260/29.3; 428/443; 428/474; 428/481; 428/524; 428/526; 428/531; 528/130; 528/134
[58] Field of Search ............... 260/29.3; 428/443, 474, 428/481, 524, 526, 531

[56] References Cited

U.S. PATENT DOCUMENTS

| | | | |
|---|---|---|---|
| 2,855,382 | 10/1958 | Mitchell | 260/57 |
| 3,464,956 | 9/1969 | Peterson | 260/57 |
| 3,694,387 | 9/1972 | Junger et al. | 260/59 |
| 3,740,358 | 6/1973 | Christie et al. | 260/59 |
| 3,761,448 | 9/1973 | Anderson | 260/53 R |

*Primary Examiner*—Theodore E. Pertilla
*Attorney, Agent, or Firm*—Joseph S. Nelson; William J. Farrington; James C. Logomasini

[57] ABSTRACT

The invention relates to a binder composition comprising a low molecular weight resole resin in combination with boron compounds wherein said boron compounds are present in from about 1 to 30 parts per 100 parts by resole resin solids, said composition having a pH of about 2–6 and said resole having a viscosity of from about 5 to 5000 cps. Said binder provides laminates having superior electrical and flame retardant properties.

10 Claims, No Drawings

RESOLE RESIN BINDER COMPOSITION

This is a division of application Ser. No. 634,572, filed Nov. 24, 1975, now U.S. Pat. No. 4,045,398.

BACKGROUND OF THE INVENTION

In order to get acceptable processing speed from resole resin impregnated substrates, it is common practice to use phenol-formaldehyde resoles which have high molecular weight, that is, they are reacted to near the gel point in the preparation. These materials have to be dissolved in an organic solvent to provide viscosities low enough to be processable. The high viscosity leads to poor resin penetration into many substrates, with the result being certain properties of the finished article such as water absorption and appearance. Also, during resin preparation the resin high viscosity leads to poor heat transfer, longer resin cycles, and molecular weight distribution becomes too broad.

Thus, in accordance with the present invention, resole resin binder compositions are provided with greatly accelerated cure rates that provide laminates having excellent electrical and fire-retardant properties. It has been discovered that the addition of 1 to 30 parts of boron compounds per hundred parts of resole resin solids provides novel binder compositions with great utility. Because of the boron additive, resole resins can be made of low molecular weight and narrow molecular weight distribution giving a more reliable, reproducable resin product in shorter cycles. No organic solvent need be used, eliminating a large pollution contributor. Penetration of this low molecular weight resin into any substrate is excellent. Processing speed is equal or better compared to currently used resole varnishes, and final laminated product properties are better, especially electrical and flam resistance properties.

SUMMARY OF THE INVENTION

This invention relates to a binder composition comprising a low molecular weight resole resin and a boron compound curing accelerator, selected from the group consisting of boric acid, diammonium tetraborate, diammonium octaborate, diammonium pentaborate and mixtures thereof, said boron compound being present in from about 1 to 30 parts by weight per 100 parts of resole resin solids, said composition having a pH of about 2-6 and said resole resing having a viscosity of 5 to 5000 cps.

DETAILED DESCRIPTION OF THE INVENTION

Resole Resins

The phenol-formaldehyde resole resins of the present invention are prepared from a phenol selected from the group consisting of phenol, substituted phenols and substituted phenol mixtures and mixtures thereof.

The substituted phenols useful in the resins of this invention are all phenols that have at least one reactive position open in the ortho or para position. Phenol and such substituted phenols or their mixtures can be used. Substituted phenols include all phenols having at least one attached radical selected from the group consisting of alkyl, aryl, cycloalkyl, alkenyl, cycloalkenyl, alkaryl, aralkyl, carbocyclic, halogen and mixtures thereof.

Examples of substituted phenols include: phenols substituted with straight and branched chain alkyl radicals having 1 to 16 carbon atoms, e.g., cresol, isopropylphenol, 2,3-xylenol, 3,5-xylenol, 3,4-xylenol, 2,6-xylenol, mono and disubstituted butyl, amyl, octyl, nonyl, decyl and dodecyl phenols; aryl substituted phenols, e.g., phenyl phenol and naphthyl phenol; cycloalkyl phenols, e.g., terphenylphenols, e.g., using limonene, pinene, methadiene, cyclohexyl and cyclopentyl; cycloalkenyl phenols, e.g., cyclopentenyl, dicyclopentadieneyl and methacyclopentadieneyl phenols; alkenyl phenols, e.g., allylphenol, styrene, butenylphenol, pentenyl phenol, hexenylphenol; alkaryl phenols, e.g., tolylphenol, xylylphenol, propylphenylphenol; aralkyl phenols, e.g., benzyl, phenethyl, alphamethyl, phenyethyl, indyl and cymyl phenols bisphenol A, bisphenol F, halophenols, e.g., chlorophenols, bromophenols, 2,4 dichlorophenol, 2,6 dichlorophenol, etc.

The substituted phenol mixture used to make such resin is prepared by reacting phenol under Friedel-Crafts conditions with a controlled mixture of carbocyclic compounds. The mixture of carbocyclic compounds comprises (on a 100 weight percent basis when in a form substantially free of other materials);

(A) From about 10 through 40 weight percent of compounds each molecule of which has:
 (1) the indene nucleus,
 (2) from 9 through 13 carbon atoms,
 (3) as nuclear substituents from 0 through 4 methyl groups,
(B) From about 5 through 70 weight percent of compounds each molecule of which has:
 (1) the dicyclopentadiene nucleus,
 (2) from about 10 through 13 carbon atoms,
 (3) as nuclear substituents from 0 through 3 methyl groups,
(C) From about 15 through 65 weight percent of compounds each molecule of which has:
 (1) a phenyl group substituted by a vinylidene group,
 (2) from about 8 through 13 carbon atoms,
 (3) as substituents from 0 through 3 groups selected from the class consisting of methyl and ethyl,
(D) From about 0 through 5 weight percent divinyl benzene;
(E) Provided that the sum total of all such compounds in any given such mixture of carbocyclic compounds is always 100 weight percent.

Such substituted phenol mixtures and the resole resins prepared therefrom can be prepared by methods disclosed in U.S. Pat. No. 3,761,448.

Resole resins are easily made by reacting phenol and formaldehyde in the presence of basic catalysts. Examples of low molecular weight phenol-aldehyde resole resins having characteristics suitable for use in this invention are as follows:

EXAMPLE 1

Phenol (100 parts) 50 percent formalin (111 parts), and triethylamine (5 parts) are charged to a vessel. The resulting mixture is reacted at about 70° C. until the free formaldehyde content is less than about 4 percent, after which the mixture is cooled. The product is a low molecular weight water soluble phenol-formaldehyde resole resin having 81 percent solids, 9 percent $H_2O$ and a viscosity of 2400 cps.

EXAMPLE 2

Phenol (100 parts), 50 percent formalin (80 parts, and triethylamine (2 parts) are charged to a vessel. The resulting mixture is reacted at about 85° C. until the free formaldehyde content is less than about 2 percent, after which the mixture is cooled. The product is a low molecular weight water soluble phenol-formaldehyde resole resin having 78 percent solids, 8 percent $H_2O$ and a viscosity of 1100 cps.

EXAMPLE 3

Phenol (100 parts), 50 percent formalin (70 parts) and triethylamine (2 parts) are charged to a vessel. The resulting mixture is reacted at about 85° C. until the free formaldehyde content is less than about 1 percent, after which the mixture is cooled. The product is a low molecular weight water soluble phenol-formaldehyde resole resin having 74 percent solids, 4 percent $H_2O$ and a viscosity of 650 cps.

EXAMPLE 4

Phenol (100 parts), 50 percent formalin (111 parts) and calcium hydroxide (2.0 parts) are refluxed at 70° C. to a free formaldeyde level of less than 4 percent. The resin is cooled and carbon dioxide bubbled into the resin to a pH of 7.0. The salt formed is filtered from the resin. The product is a clear, low molecular weight, water-soluble phenol-formaldehyde resole resin having 83 percent solids, 7 percent $H_2O$ and a viscosity of 3300 cps.

EXAMPLE 5

Phenol (100 parts), 50 percent formalin (111 parts) and 50 percent aqueous sodium hydroxide (4 parts) are refluxed at 70° C. to a free formaldehyde level of less than 4 percent. The resin is cooled and phosphoric acid added to a pH of 7.0. The salt formed is filtered from the resin. The product is a clear, low molecular weight, water-soluble phenol-formaldehyde resole having a solids of 80 percent, 7 percent $H_2O$ and a viscosity of 3000 cps.

EXAMPLE 6

Cresol (40 parts), phenol (60 parts), 50 percent formalin (111 parts) and triethylamine (5 parts) are refluxed at 70° C. to a free formaldehyde content of less than 4 percent, and the mixture cooled. The resin is a low molecular weight phenol-formaldehyde resole product having a solids of 80 percent, 9 percent $H_2O$ and a viscosity of 2000 cps.

Alkylated phenols of many types can be used to make low molecular weight resole resins. These substituted phenols are prepared by reacting phenol under Friedel-Crafts conditions with an unsaturated compound or mixtures of such compounds.

To react phenol with such a compound mixture, it is convenient to use Friedel-Crafts conditions, as indicated.

The term "Friedel-Crafts conditions" as used herein refers to the conventional conditions known to those of ordinary skill in the art used for the alkylating or arylating of hydrocarbons (including phenol) by the catalytic action of aluminum chloride or equivalent acid catalyst in the presence of appropriate heat and pressure. In the practice of this invention, the phenol and suitable Friedel-Crafts acid catalyst are mixed, brought to the proper temperature, and the compound mixture metered into the acidified (or catalyzed) phenol.

For purposes of this invention, the reaction of the compound mixture with phenol is preferably carried out at temperatures in the range of from about 25° to 200° C. although higher and lower temperatures can be used. Also, the reaction is preferably conducted under liquid phase conditions at or below atmospheric pressure although superatmospheric pressures can be used.

Friedel-Crafts catalysts which may be used in place of aluminum chloride, or together with aluminum chloride, include:

(A) Other inorganic halides, such as gallium, titanium, antimony and zinc halides (including $ZnCl_2$);

(B) Inorganic acids such as sulphuric, phosphoric and the hydrogen halides (including HF);

(C) Activated clays, silica gel and alumina;

(D) $BF_3$ and $BF_3$ organic complexes, such as complexes of $BF_3$ with organic compounds, such as ethanol, butanol, glycol, phenol, cresol, anisole, ethyl ether, isopropyl ether, di-n-butyl ether, formic acid, acetic acid, propionic acid and the like, or with inorganic acids, such as phosphoric acid, sulfuric acid, and the like, and (E) Alkyl, aryl and aralkyl sulfonic acids, such as ethanesulfonic acid, benzene sulfonic acid, benzene disulfonic acid, chlorobenzene sulfonic acid, 3,4-dichlorobenzene sulfonic acid, cresol sulfonic acids, phenol sulfonic acids, toluene sulfonic acids, xylene sulfonic acids, octylphenol sulfonic acid, - naphthalene sulfonic acid, 1-naphthol-4-sulfonic acid, and the like.

When $BF_3$, as such, is employed, it is conveniently fed to a reaction mixture in gaseous form.

While any combination of compound starting mixture, phenol, and catalyst can be used, it is particularly convenient to react phenol with the compound mixture in the presence of less than about 10 weight percent (based on the starting phenol) of acid catalyst. Typically, from about 0.1 to 1 weight percent of Friedel-Crafts acid cataylst is employed (based on phenol).

The reaction mass is heated to a temperature in the range of from about 25° to 200° C. The rate of this reaction is dependent, to some degree, on the temperature employed. In general, the reaction is rapid, and a complete reaction between phenol and compound mixture is preferred. Generally, a total heating time of from about 10 minutes to 4 hours is employed. The various process variables are summarized in Table I below.

TABLE I

| Process variable | Broad range | Preferred range |
| --- | --- | --- |
| Temperature (° C.) | About 25 to 200° C. | About 40 to 125° C. |
| Reaction Time | About 4 hours | About 10 to 30 min. |
| Catalyst (based on phenol) | Less than about 10 weight percent | About 0.1 to 1.0 weight percent |

The properties of a given so-substituted phenol product are affected by the process conditions used to make that product (e.g. molecular weight distribution, color, and the like). The resulting reaction product is, as those skilled in the art will appreciate, a complex mixture of various different substituted phenols produced from the reaction of phenol under Friedel-Crafts conditions with the compound starting mixture to produce phenol molecules which are substituted on ring carbon atoms.

In general, to produce a resole for use in this invention, a phenol, as just described, is neutralized under aqueous liquid phase conditions as by the addition of base and then from about 1.0 to 3.0 mole of formaldehyde per one mol of phenol is mixed with the phenol (now itself a starting material). Water may be added with the formaldehyde. Formalin is preferred as a source for formaldehyde. Also, a basic catalyst material, such as ammonium hydroxide and/or amine selected from the group consisting of primary amines (such as ethylamine, isobutylamine, ethanol amine, cyclohexylamine, and the like); secondary amines (such as diethanol amine, piperidine, morpholine, and the like); and tertiary amines (such as triethylamine, triethanolamine, diethyl cyclohexyl amine, triisobutyl amine; and the like) is introduced into the reaction mixture include metal oxides and hydroxides. Preferred amine catalysts have molecular weights below about 300 and more preferably below about 200. The amine catalyst may include hydroxyl groups which tend to promote solubility of the amine in the reaction mixture. This basic catalyst itself thus can be used to neutralize the starting substituted phenol. The pH of this reaction mixture is maintained from (7.0 and preferably above about 7.5) but below about 8.5. This reaction mixture is then heated to temperatures of from about 60 to 100° C. for a time sufficient to substantially react most of the formaldehyde and thereby produce a desired resole product. Times of from about 20 to 180 minutes are typical. Aqueous liquid phase preparation conditions are used.

It will be appreciated that the formaldehyde to phenol mol ratios herein described have reference to the total amount of phenol present before a reaction, including the phenol which is substituted by the compound mixture as described above.

To optimize electrical properties in resoles used in this invention, it is preferred to use as a basic catalyst, when reacting such substituted phenols with formaldehyde to make resole resins, one which is non-ionic and non-metallic in character.

The resole product produced by reacting the phenol with formaldehyde as described above is one composed of methylolated substituted phenol which has been methylolated by the fomaldehyde to a desired methylol content. As those skilled in the art fully appreciate, the methylol content and the degree of advancement are readily controllable, so that one can optimize such a resole resin for use in a particular application. For purposes of this invention, a phenol-formaldehyde resole resin or resole can be regarded as being the reaction product of the above-described phenols and formaldehyde under the aqueous base catalyzed conditions as described herein which product can be thermoset by heat alone without the use of a curing catalyst.

The following example shows how the low molecular weight, substituted phenol resole resin is prepared.

EXAMPLE 7

Charge 100 parts phenol and 0.3 part concentrated sulfuric acid to a reaction vessel and adjust the temperature to 75° C. Meter in 20 parts styrene over 10 minutes. The reaction temperature will rise to 100° C. due to the exothermic reaction of styrene with phenol. Hold the reaction mixture at 100° C. for 10 minutes, cool to 50° C. and add 5 parts triethylamine, 80 parts formalin and react at 70° C. to a free formaldehyde level of less than 2 percent. Dehydrate the resin to a refractive index of 1.559. The product is a clear, low molecular weight, water soluble resole resin made with phenol and styrene substituted phenol.

The following examples are presented in tabular form. The process in all instances is shown in Example 7 except that the indicated variables are altered as shown in Table II below.

TABLE II

| Example | Unsaturated Compound Mixture[1] Type | Amount | Temp. ° C. |
|---|---|---|---|
| 8 | 1 | 30 | 100 |
| 9 | 2 | ↓ | ↓ |
| 10 | 3 | ↓ | ↓ |
| 11 | 4 | ↓ | ↓ |
| 12 | 5 | ↓ | ↓ |
| 13 | 6 | ↓ | 125 |
| 14 | 7 | ↓ | 100 |
| 15 | 8 | ↓ | ↓ |
| 16 | 9 | ↓ | ↓ |
| 17 | 10 | ↓ | 125 |

[1]Numbers listed under "Type Unsaturated Compound Mixture" each designate a specific composition as shown below.

| | 1 | 2 | 3 | 4 | 5 | 6 | 7 | 8 | 9 | 10 |
|---|---|---|---|---|---|---|---|---|---|---|
| styrene | 25 | | | | 5 | | 50 | 50 | 50 | 50 |
| α-methyl styrene | 25 | 100 | | | 5 | | 50 | | | |
| vinyl toluene | 25 | | 100 | | 30 | | | 50 | | |
| indene | 25 | | | 100 | 30 | | | | 50 | |
| dicyclopentadiene | | | | | 30 | 100 | | | | 50 |

All these resoles are characteristically one-phase, clear liquid solutions, each having a viscosity ranging from about 5 to 5000 centipoises. The exact viscosity of a given solution depends upon many chemical process and product variables. For impregnating applications, viscosities of from about 50 to 2000 centipoises are preferred. Dilution with water or organic solvents is used to adjust the viscosity into preferred ranges.

The total solids content of a given resole resin can be as high as about 85 weight percent or even higher, and as low as about 20 weight percent or even lower, but preferred solids contents usually fall in the range of from about 25 to 75 weight percent.

When used for impregnation and reinforcing purposes, the resole resins of this invention are useful for impregnating cellulosic paper, asbestos paper, and other non-woven sheet structures as well as woven fabrics (cotton, glass fibers, nylon, etc.), etc. Impregnation can be accomplished by any convenient means, including dipping, coating, spraying, mixing or the like. The so-impregnated material is dried to lower the volatiles content and then heated to advance the resin to the proper degree for the intended use. The resoles of this invention are useful in the preparation of laminates, such as those made from such impregnated sheet materials. Such laminates are used in electrical applications as supports or as insulation for conductive elements. The laminates are generally manufactured in a sheet or block form which is then punched or otherwise machined to provide desired configuration for a particular end use.

The resole resins of this invention are also useful in the manufacture of cloth laminates, and automotive oil filters. A suitable oil filter media, for example, is prepared by impregnating with a resole of this invention, cellulosic fiber paper modified with a synthetic fiber (polyester, or the like) and having a thickness of from about 5 to 20 mils. Sufficient of the resole resin of this invention is used to obtain an impregnated sheet member having a cured resin content of about 35 to 65 percent preferably about 15 to 25 percent, based on the weight of the paper. After such paper is so impregnated, it is heated to advance the resin to a so-called B-stage, and then is corrugated or pleated to form the filter element. The filter element is then assembled with the end use filter container and heated to 250° F. to 350° F. for from 5 to 20 minutes to cure the resin. When cured, the product has good flexibility and low tendency to crack during use.

Boron Compound Accelerators

The accelerators employed in the composition of the present invention are boron compounds selected from the group consisting of boric acid $H_3BO_3$, diammonium tetraborate $(NH_4)_2O2B_2O_3 \cdot 4H_2O$, diammonium octaborate $(NH_4)_2O4B_2O_3 \cdot 6H_2O$, diammonium pentaborate $(NH_4)_2O5B_2O_3 \cdot 8H_2O$ and mixtures thereof. Such preferred boron compounds are described in the Encyclopedia of Chemical Technology, 2nd Edition, 1964, Interscience Publishers, New York, N. Y., Vol. 3, pages 609-648.

Boron compounds as described above are added to the resins described in the examples to give the desired properties of lower dry rubber for fast treating yet retain low molecular weight for good impregnation into a variety of substrates, enhanced electrical properties, no organic solvent needed for lower pollution potential and better flame resistance.

The amount of boron compound can vary from about 1 part per 100 resin solids to about 30 parts (same basis). Preferably, between 2 and 10 parts are needed to obtain the desired end results listed above. Excessive amounts of boron compounds are not soluble or if soluble, crystallize out when cold. When boric acid or the ammonium borates are used alone, the pH of resoles is usually about 2-6. This may lead to corrosion and the above mentioned insolubility in certain resoles. This problem is solved by raising the resin mixture pH with ammonium hydroxide to about 7-10. Dry rubber lowering effectiveness is reduced only slightly, and corrosion to metals such as iron is avoided and compatibility is improved.

The boron compounds are dissolved in the resole resins by conventional mixing as can be appreciated by those skilled in the art. The solutions formed are stable at temperatures usually used for storing and shipping resole resins binder compositions.

Binder Compositions

The binder composition has, in combination, a resole resin comprising resin solids of from 20 to 85 percent, preferably 25 percent 75 percent, by weight, a dissolved water content of 0.5 to 35 percent, preferably 2.0 to 15 percent by weight based on said resole resins solids, said resole having a viscosity of from about 5 to 5000 cps preferably 50 to 700 cps, said composition having present from about 1.0 to 30 parts, preferably 2 to 10 parts of a boron compound based on said resole resin solids.

The binder composition can be a solution wherein said resole resin and accelerator are contained in a solution comprising about 20 to 98 percent, preferably 25 to 75 percent by weight of resin solids, about 2 to 80 percent, preferably 25 to 75 percent by weight water and about 0.5 to 5 parts preferably 1 to 3 parts of a boron compound based on said resin solids.

The binder composition can be a solution or varnish wherein said resole resin and accelerator are contained in a solution comprising:

(A) about 20 to 85 percent by weight of resole resin solids,
(B) about 0.5 to 15 percent by weight of water,
(C) about 0.5 to 5 parts by weight accelerator per 100 parts of resole resin solids, and
(D) the balance up to 100 percent by weight of said solution being an organic liquid which
  (1) is substantially inert to said resin and water,
  (2) evaporates below about 150° C., at atmospheric pressures,
  (3) is a mutual solvent for said resin, said water and said accelerator, being present in an amount sufficient to maintain a solution.

The organic liquid is a relatively volatile, inert organic solvent medium having the properties described above. While the organic liquid used has properties as indicated above, it will be appreciated that such liquid can comprise mixtures of different organic liquids. Preferred liquids are lower alkanols (such as ethanol and methanol) and lower alkanones (such as acetone or methyl etyl ketone). The term "lower" refers to less than 7 carbon atoms per molecule as used herein. Aromatic and aliphatic (including cycloaliphatic) hydrocarbons can also be employed as solvents for a given resin, including benzene, toluene, xylene, naphthalene, nonane, octane, petroleum fractions, etc. Preferably, the total water content of a solution of the invention is below about 15 weight percent, and more preferably falls in the range of from about 0.5 to 5 weight percent.

Those skilled in the art will appreciate that care should preferably be taken to use an organic liquid system in which the phenolic resole resins are completely soluble as well as any water present. Adding, for example, a ketone or an ether-ester solvent like butyl Cellosolve will generally improve the water tolerance (ability to dissolve water) of a solvent system.

EMBODIMENTS

The following examples are set forth to illustrate more clearly the principles and practices of the invention to one skilled in the art. They are not intended to be restrictive but merely to be illustrative of the invention. Unless otherwise stated herein, all parts and percentages are by weight.

Dry rubbers of other phenolic resin resole mixtures with acids and ammonium salts of acids were run to determine how broadly the dry rubber lowering effect was. Please see attached Table III. Dry rubber correlates with process speed. Oxalic acid, benzoic acid, acetic acid and lacetic acid give increased dry rubbers, 3.3–5.1 pH, whereas sulfamic acid gave much lower dry rubber at 7.5 pH (compared to the control at pH 8.2). Sulfuric acid and phosphoric acid gave reduced dry rubbers at low pH. Thus, there is no correlation of pH and dry rubber. Of all the ammonium salts tested, ammonium borate gave the most dry rubber lowering and also was the only salt to give low pH (3.0). All other salts gave >5.7 pH. Since boric acid is very weak, the low pH is attributed to the presence of polyhydroxy compounds forming a stronger acid with one monoborate ion $B(OH)_4^-$ and two molecules of polyhydroxy compound. When running dry rubbers or resin mixtures it was noted that $NH_4$ borates and boric acid were the only additives to give a rapid molecular weight build-up on the cure plate. All other additives shown on the Table were of low viscosity for most of the test and then rapidly gelled.

It is evident that none of the substances tested in Table III (except borates) will give the combination of fast processing, better electricals and flame resistance.

TABLE III

EXAMPLES 1 – 39
Dry Rubber/pH with Selected Acid and Salts and Phenolic Resole

| Example | Amount (per 100 resin resole) | Acid | pH (with added H$_2$O) | 150° DR | K |
|---|---|---|---|---|---|
| 1 | 0 | control[1] | 8.2 | 203 | |
| 2 | 4 | oxalic | 3.3 | 278 | ($K_1 = 6.5 \times 10^{-2}$) |
| 3 | 8 | oxalic | 1.8 | 38 | ($K_2 = 6.5 \times 10^{-5}$) |
| 4 | 4 | lactic | 5.1 | 225 | |
| 5 | 8 | lactic | 3.6 | 189 | $1.4 \times 10^{-4}$ |
| 6 | 4 | benzoic | 5.1 | 285 | $1.5 \times 10^{-5}$ |
| 7 | 4 | acetic | 4.5 | 259 | $1.8 \times 10^{-5}$ |
| 8 | 2.5 | sulfamic | 7.5 | 132 | |
| 9 | 0 | control[2] | 8.2 | 285 | |
| 10 | 2 | phosphoric | 2.7 | 145 | ($K_1 = 7.5 \times 10^{-3}$) ($K_2 = 6.2 \times 10^{-8}$) ($K_3 = 4.8 \times 10^{-13}$) |
| 11 | 2.5 | sulfuric | 1.1 | 25 | ($K_1 = 4 \times 10^{-1}$) ($K_2 = 1.2 \times 10^{-2}$) |
| 12 | 1.3 | sulfuric | 2.2 | 90 | |
| 13 | 1.16 | sulfuric | 7.3 | 215 | |
| 14 | 1.0 | sulfuric | 7.5 | — | |
| 15 | 0 | control[3] | 8.2 | 203 | |
| 16 | 1 | boric | 7.7 | 180 | $5.8 \times 10^{-10}$ |
| 17 | 2 | boric | 2.9 | 140 | |
| 18 | 4 | boric | 2.4 | 80 | |
| 19 | 8 | boric | 2.0 | 40 | |
| 20 | 0 | control[4] | 8.2 | 285 | |
| 21 | 4 | ammonium acetate | 8.2 | 255 | |
| 22 | 4 | ammonium formate | 6.1 | 207 | |
| 23 | 4 | ammonium sulfamate | 6.9 | 205 | |

| Example | Amount (per 100 resin resole) | | pH (with added H$_2$O) | 150° DR[6] | K |
|---|---|---|---|---|---|
| 24 | 4 | ammonium citrate | 6.0 | 197 | |
| 25 | 4 | ammonium nitrate | 6.0 | 176 | |
| 26 | 4 | ammonium tartrate | 6.5 | 174 | |
| 27 | 4 | ammonium chloride | 5.7 | 165 | |
| 28 | 4 | ammonium oxalate | 6.8 | 154 | |
| 29 | 4 | ammonium sulfate | 5.9 | 145 | |
| 30 | 4 | diammonium phosphate | 7.1 | 136 | |
| 31 | 4 | ammonium pentaborate | 3.0 | 110 | |
| 32 | 4 | ammonium biborate | 3.0 | 110 | |
| 33 | 0 | control[5] | 8.2 | 285 | |
| 34 | 2 | NaH$_2$PO$_4$ | 7.7 | 285 | |
| 35 | 2 | NH$_4$H$_2$PO$_4$ | 6.8 | 190 | |
| 36 | 2 | (NH$_4$)$_2$HPO$_4$ | 7.2 | 175 | |
| 37 | 4 | (NH$_4$)$_2$HPO$_4$ | 7.0 | 136 | |
| 38 | 2 | Na$_3$PO$_4$ | 8.5 | 155 | |
| 39 | 2 | H$_3$PO$_4$ | 2.7 | 145 | |

[1]Resin A slightly advanced
[2]Resin A
[3]Resin A slightly advanced
[4]Resin A
[5]Resin A
[6]DR - dry rubber test-composition spread on hot plate at desired cure temperature and worked with a spatula until no viscous strings form on removal of spatula. Time in seconds to reach rubbery state determines rate of cure.

Phenolic resin resole laminates have faster treating, improved electricals and improved flame resistance when boric acid is added as compared to standard phenolic varnish, and resoles without boric acid.

Examples 40 to 46 and Table IV are shown below illustrating the effects of boric acid on several resole resins.

TABLE IV

EXAMPLES 40 – 46

| Examples | 40 | 41 | 43 | 44 | 45 | 46 |
|---|---|---|---|---|---|---|
| Resin | Phenol-formaldehyde resole[7] | | Resole[6] | Alkylated P/F | | Resole[8] |
| Boric acid, parts/100 resin | 0 | 5 | 10 | 0 | 0 | 7 | 9 |
| 160° C. dry rubber, seconds | 178 | 55 | 40 | 50 | 160 | 60 | 50 |
| B-stage time[1], minutes | 17 | 4 | 4 | 4 | 20 | 4½ | 4½ |
| Water Absorption[2], % | 0.9 | 0.9 | 1.2 | 0.7 | 0.3 | 0.5 | 0.7 |
| Dielectric A[4] Constant at D24/23[2] 10$^6$ cps | 5.7 / 6.0 | 5.0 / 5.3 | 4.4 / 4.7 | 5.2 / 5.4 | 4.7 / 4.8 | 4.2 / 4.3 | 3.9 / 4.0 |
| Dissipation A[4] Factor at D24/23[2] 10$^6$ cps | .047 / .051 | .044 / .046 | .038 / .045 | .040 / 4 | .038 / .039 | .036 / .038 | .029 / .032 |
| Underwriter's Lab Flame Test, seconds[3] | BURNS | 17(37) | 16(19) | BURNS | BURNS | 17(28) | 13(16) |
| Insulation Resistance | 4.5 × | 1.1 × | 3.4 × | — | 1.3 × | 3.3 × | 1.3 × |

TABLE IV-continued

| | EXAMPLES 40 – 46 | | | | | |
|---|---|---|---|---|---|---|
| Examples | 40 | 41 | 43 | 44 | 45 | 46 |
| Resin | Phenol-formaldehyde resole[7] | | Resole[6] | Alkylated P/F | | Resole[8] |
| megohms Cond. A[4] | $10^6$ | $10^7$ | $10^7$ | $10^7$ | $10^7$ | $10^8$ |

Footnotes:
[1]135° C. air oven, time to acceptable flow
   laminate resin contents - 54–57%
   paper used - cotton linter
   cure conditions - 30 minutes/150° C./1000 psi
[2]24 hours in 23° C., water = D24/23
[3]0 = highest number, test number is average of six 10" ignitions
[4]Cond. A = as is
[5]Loss Index = product of dielectric constant and dissipation factor
[6]alkylated phenolic resole high molecular weight resin viscosity of 25,000 cps with about 7 percent $H_2O$
[7]RESIN EXAMPLE B
[8]RESIN EXAMPLE L It is evident from Example 43 that advanced resole resins provide laminates with poorer electrical properties as compared to the low viscosity resoles of the present invention used in combination with said boron compounds, as accelerators.

EXAMPLES 47–51

The resin of Example 3 (100 parts) was used in combination with boric acid to prepare binder compositions. The pH of binder composition was adjusted with ammonium hydroxide to test curing rates and iron corrosion. Table V below shows the results of these tests.

TABLE V

| Example | Boric Acid | $NH_4OH$ | pH | 150° C. DR | Iron Corrosion |
|---|---|---|---|---|---|
| 47 | 0 | 0 | 7.9 | 540 | none |
| 48 | 8 | 0 | 2.6 | 130 | yes |
| 49 | 8 | yes | 5.7 | 130 | yes |
| 50 | 8 | yes | 6.9 | 105 | slight |
| 51 | 8 | yes | 8.2 | 105 | none |

It is evident that curing rate of the composition is retained at high levels with boric acid accelerators in the presence of $NH_4OH$ with corrosion being controlled at higher pH values of greater than 7.

EXAMPLES 52–53

Examples 47–51 were repeated using 8 parts of ammonium tetraborate and ammonium pentaborate respectively. The pH of the compositions were found to be about 3. The compositions were adjusted to a pH of about 8 and the dry rubber rates were found to be about 120 seconds with a control of about 450 seconds showing that $NH_4OH$ can be used to adjust pH into the range of 7–10 without affecting cure rate.

What is claimed is:

1. A laminate comprising, a substrate sheet structure of fibers selected from the group consisting of cellulosic, asbestos, glass, synthetic and cellulosic modified with a synthetic, said substrate being impregnated and bonded with about 15 to 65 weight percent of a cured resole resin solids containing about 1 to 30 parts by weight of a boron compound accelerator based on 100 parts of said resole resin solids, the remainder, up to 100% by weight of said laminate being substrate, said boron compound being selected from the group consisting of boric acid, diammonium tetraborate, diammonium octaborate, diammonium pentaborate and mixtures thereof.

2. A laminate of claim 1 wherein said resole resin comprises the reaction product of formaldehyde and a phenol, said phenol selected from the group of phenol, substituted phenols, substituted phenol mixture and mixtures thereof in a mol ratio 1.0 to 3.0, reacted in the presence of a basic catalyst.

3. A laminate of claim 2 wherein said substituted phenol mixture has been prepared by alkylation of phenol with a mixture of carbocyclic compounds under acid conditions at a temperature in the range of 25° to 200° C., whereby 10 to 80 parts by weight of the mixture of carbocyclic compounds reacts with 100 parts by weight of phenol, said mixture of carbocyclic compounds comprising:
   (A) from 10 to 40 parts by weights of compounds each molecule of which has:
      (1) the indene nucleus,
      (2) from 9 to 13 carbon atoms,
      (3) as nuclear substituents from 0 to 4 methyl groups;
   (B) from 5 to 70 parts by weight of compounds each molecule of which has:
      (1) the dicyclopentadiene nucleus,
      (2) from 10 to 13 carbon atoms,
      (3) as nuclear substituents from 0 to 3 methyl groups;
   (C) from 15 to 65 parts by weight of compounds each molecule of which has:
      (1) a phenyl group substituted by a vinylidene group.
      (2) from 8 to 13 carbon atoms,
      (3) as substituents from 0 to 3 groups selected from the class consisting of methyl and ethyl; and
   (D) from 0 to 5 parts by weight of divinyl benzene.

4. A laminate of claim 2 wherein said phenol is phenol.

5. A laminate of claim 2 wherein said phenol is a substituted phenol having at least one radical selected from the group consisting of alkyl, aryl, cycloalkyl, alkenyl, cycloalkenyl, alkaryl, aralkyl, carbocyclic, halogen and mixtures thereof.

6. A laminate of claim 2 wherein said basic catalyst is selected from the group consisting of ammonium hydroxide, hexamethylene tetramine and triethylamine.

7. A laminate of claim 1 wherein said boron compound is boric acid.

8. A laminate of claim 1 wherein said boron compound is diammonium tetraborate or diammonium pentaborate and mixtures thereof.

9. A laminate of claim 1 wherein the boron compound is present in from about 2 to 10 parts by weight of boron compound per 100 parts of resole resin solids.

10. A laminate of claim 1 wherein said resole resin containing said boron compound has a pH of about 2 to 10.

* * * * *